(12) United States Patent
Lange

(10) Patent No.: US 8,959,383 B2
(45) Date of Patent: Feb. 17, 2015

(54) FAILOVER ESTIMATION USING CONTRADICTION

(75) Inventor: Hilton Arnold Lange, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 184 days.

(21) Appl. No.: 13/517,541

(22) Filed: Jun. 13, 2012

(65) Prior Publication Data

US 2013/0339800 A1 Dec. 19, 2013

(51) Int. Cl.
*G06F 11/00* (2006.01)

(52) U.S. Cl.
USPC .................................. 714/1; 714/2

(58) Field of Classification Search
CPC ..... G06F 9/5077; G06F 9/505; G06F 9/5083; G06F 11/0748; G06F 11/0793; G06F 11/1469; G06F 11/1641; G06F 11/2038
USPC ......................................... 714/1, 2
See application file for complete search history.

(56) References Cited

U.S. PATENT DOCUMENTS

| | | | | |
|---|---|---|---|---|
| 8,489,744 | B2 * | 7/2013 | Elyashev et al. | 709/226 |
| 8,589,921 | B2 * | 11/2013 | Heim | 718/1 |
| 2010/0070978 | A1 * | 3/2010 | Chawla et al. | 718/105 |
| 2010/0115049 | A1 * | 5/2010 | Matsunaga et al. | 709/216 |
| 2010/0332658 | A1 * | 12/2010 | Elyashev | 709/226 |
| 2011/0072138 | A1 | 3/2011 | Canturk et al. | |
| 2011/0185064 | A1 * | 7/2011 | Head et al. | 709/226 |
| 2013/0014107 | A1 * | 1/2013 | Kirchhofer | 718/1 |

OTHER PUBLICATIONS

"How to determine if a cluster is over-committed in System Center Virtual Machine Manager 2008", Published on: Aug. 10, 2011, Available at: http://support.microsoft.com/kb/2463008.
Bigelow, et al., "Virtualization Explained: Definitions You Need to Know", Retrieved on: Dec. 27, 2011, Available at: http://media.techtarget.com/searchServerVirtualization/downloads/Virtualization_Explained.pdf.
Brambley, Rich, "Planning ESX Host Capacity", Published on: Jan. 12, 2011, Available at: http://vmetc.com/2008/01/12/how-many-vms-should-run-on-each-esx-host/.
"Creating and Managing Highly Available Virtual Machines in VMM", Published on: Jun. 24, 2010, Available at: http://technet.microsoft.com/en-us/library/cc967323.aspx.
"Working with Clusters", Retrieved on: Dec. 27, 2011, Available at: US/Red_Hat_Enterprise_Virtualization_for_Servers/2.2/html/Administration_Guide/Working-with-Clusters.html.

* cited by examiner

*Primary Examiner* — Yolanda L Wilson
(74) *Attorney, Agent, or Firm* — Kate Drakos; David Andrews; Micky Minhas

(57) ABSTRACT

A failover guaranty estimator module performs a proof by contradiction method showing that a cluster failover guaranty can be met for the cluster. For potential failures for which failover is guaranteed, the method assumes a particular host set of one or more hosts fails, leaving one or more working hosts. The method performs a per-failure host set method for the failure host set. The per-failure host set method determines an amount of memory usage within each working host of the assumed working host set that would guaranty that a largest of the virtual machines in the failure host set would be orphaned. The per-failure host set method determines if the virtual machines in the failure set, other than the largest virtual machine in that set, would force the determined amount of memory usage within working hosts, resulting in, the failover guaranty not being met.

20 Claims, 8 Drawing Sheets

FAILOVER ESTIMATION USING CONTRADICTION

BACKGROUND

The virtualization of computing systems has enabled the flexible and convenient setup and maintenance of computing systems. A computing system is virtualized by having a virtual machine operate remotely from the client computing system that the virtual machine serves. The virtual machine emulates the logic of a fully operational computing system including the operating system, its various applications, and corresponding settings, and interfaces with the user via a remotely located client computing system. For instance, the virtual machine receives client input from the remote client, and provides resulting desktop image information back to the client. The client does not operate the corresponding operating system, but rather just receives the user input, and renders the desktop using the resulting desktop image provided by the virtual machine.

The virtual machine operates on a host computing system (also referred to in the art as a "host" or "node" in the technical art of virtualization) typically with many other virtual machines. The hardware used by the virtual machine is also often on the host, including processing resources, storage, network, memory, and so forth. Each virtual machine maintains the proper emulation of an isolated computing system by interfacing with the available hardware through a hypervisor.

Some hosts are aggregated into "clusters". The hardware resources of the hosts within the cluster are often shared across the various hosts within the cluster. The cluster logic is also responsible for determining whether there is sufficient space within the hosts of the cluster as a whole to be able to provide for proper failover guarantees. For instance, the owner of the cluster may provide high availability guarantees to subscribers that use the various virtual machines. To support such high availability, the owner of the host may want to be sure that there is enough space in the hosts such that if any one of those hosts should fail, migration of the virtual machines would be successful.

Conventional techniques for providing such estimation are based on what is referred to as the slot-based method. In this method, the virtual machine manager used an approximation that considered all virtual machines to be consuming the same amount of memory. This is a very rough approximation, and in some circumstances, the virtual memory manager was not able to prove that the cluster was capable of recovering from nodes failures when, in fact, the cluster was capable of such recovery.

BRIEF SUMMARY

At least one embodiment described herein relates to a computing environment that includes a cluster of multiple hosts, each host operating virtual machines. The environment also includes a failover guaranty estimator module configured to attempt to perform a proof by contradiction method showing that a cluster failover guaranty can be met for the cluster.

For at least one, but potentially some or even all of the potential failures for which failover is guaranteed, the proof by contraction method assumes a particular host set of one or more hosts fails, leaving one or more working hosts. The proof by contradiction method performs a per-failure host set method for the failure host set.

The per-failure host set method determines an amount of memory usage within each working host of the assumed working host set that would guaranty that a largest of the virtual machines in the failure host set would be orphaned. The per-failure host set method then determines whether the virtual machines in the failure host set, other than the largest of the virtual machines in the failure host set, would force the determined amount of memory usage within all working hosts. If so, the failover guaranty is not met.

In many circumstances, this proof by contradiction method results in fewer false positive results that indicate a possible failure, thereby improving the results of the failure guaranty estimation. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a computing environment is described that includes cluster of multiple hosts, each host operating virtual machines. The environment also includes a failover guaranty estimator module configured to attempt to perform a proof by contradiction method showing that a cluster failover guaranty can be met for the cluster. For at least one, but potentially some or even all of the potential failures for which failover is guaranteed, the proof by contradiction method assumes a particular host set of one or more hosts fails, leaving one or more working hosts.

The proof by contradiction method performs a per-failure host set method for the failure host set. The per-failure host set method determines an amount of memory usage within each working host of the assumed working host set that would guaranty that a largest of the virtual machines in the failure host set would be orphaned. The per-failure host set method then determines whether the virtual machines in the failure host set, other than the largest of the virtual machines in the failure host set, would force the determined amount of memory usage within all working hosts. If so, the failover guaranty is not met.

First, some introductory discussion regarding computing systems will be described with respect to FIG. 1. Then, embodiments of the failover guaranty estimation will be described with respect to FIGS. 2 through 6.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
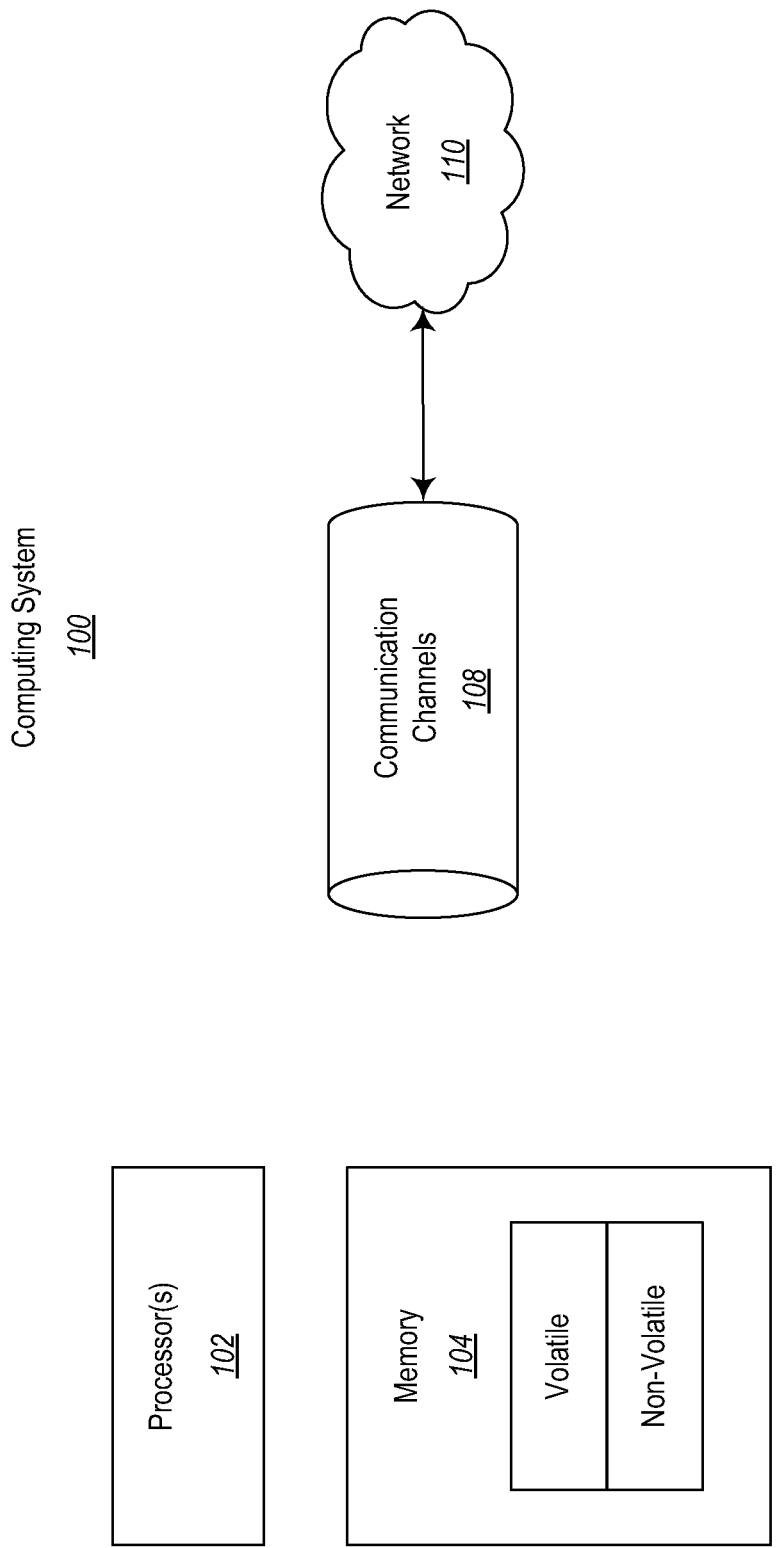
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other physical storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
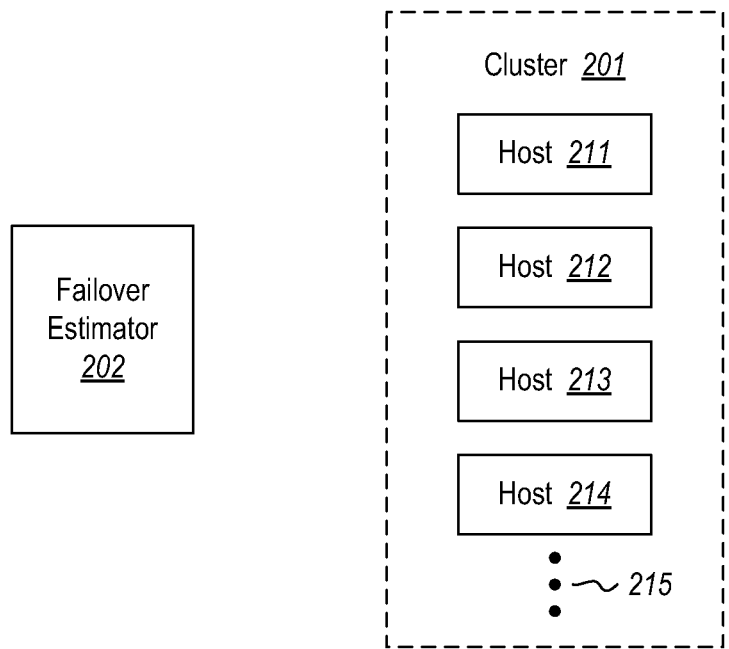
FIG. 2 illustrates a computing environment that includes a cluster of, and with an accompanying failover estimator module.

FIG. 2 illustrates a computing environment 200 that includes a cluster 201 of hosts. For instance, the cluster 201 is illustrated as including four hosts 211 through 214. However, the ellipses 215 represent that there is flexibility in the number of hosts that are within the cluster 201. There may be as few as one host within the cluster, but there may perhaps be numerous hosts within the cluster, perhaps well more than the four illustrated.

Each host has running thereon one or more virtual machines. Each virtual machine uses the hardware resources (such as storage, memory, processing resources, network bandwidth) of the host via a hypervisor to emulate a physical computing system, including a functioning operating system, one or more applications, and the like. The virtual machine may be in contact with a client if a user is interacting with the virtual machine via the client. The client renders a desktop image corresponding to the virtual machine state, and transmits user input to the virtual machine.

The environment 200 also includes a failover guaranty estimator module 202, which may be hardware, software, firmware, or a combination thereof. The failure guaranty estimator module 202 may be on a separate hardware component as compared to the hosts 211 through 215, or may be located on the hosts 211 through 215, perhaps in a distributed manner so as to survive the failure of any of the hosts. The failure guaranty estimator module 202 may be operated as part of a component that assigns virtual machines to hosts, although the module 202 may operate separately.

If implemented in software, the failover guaranty estimator module may be instantiated in memory (e.g., memory 104 of FIG. 4) of a computing system (e.g., computing system 100) and/or operated by the computing system, by one or more processors (e.g., processor(s) 102) of the computing system executing computer-executable instructions. Such computer-executable instructions may be embodied on a computer-readable media that is comprised by a computer program product.

The failover guaranty estimator module 202 attempts to perform a proof by contradiction method showing that a cluster failover guaranty can be met for the cluster. However, before describing an embodiment of the proof by contradiction method with respect to FIGS. 4 and 5A through 5C, an example of the slot-based method will be described in further detail with respect to the example three host system of FIG. 3, so that the benefits of the proof by contradiction method may be made clearer. The example three host system of FIG. 3 will be used again with respect to the example of FIGS. 5A through 5C when the example of the proof by contradiction method is described.

Figure 3:
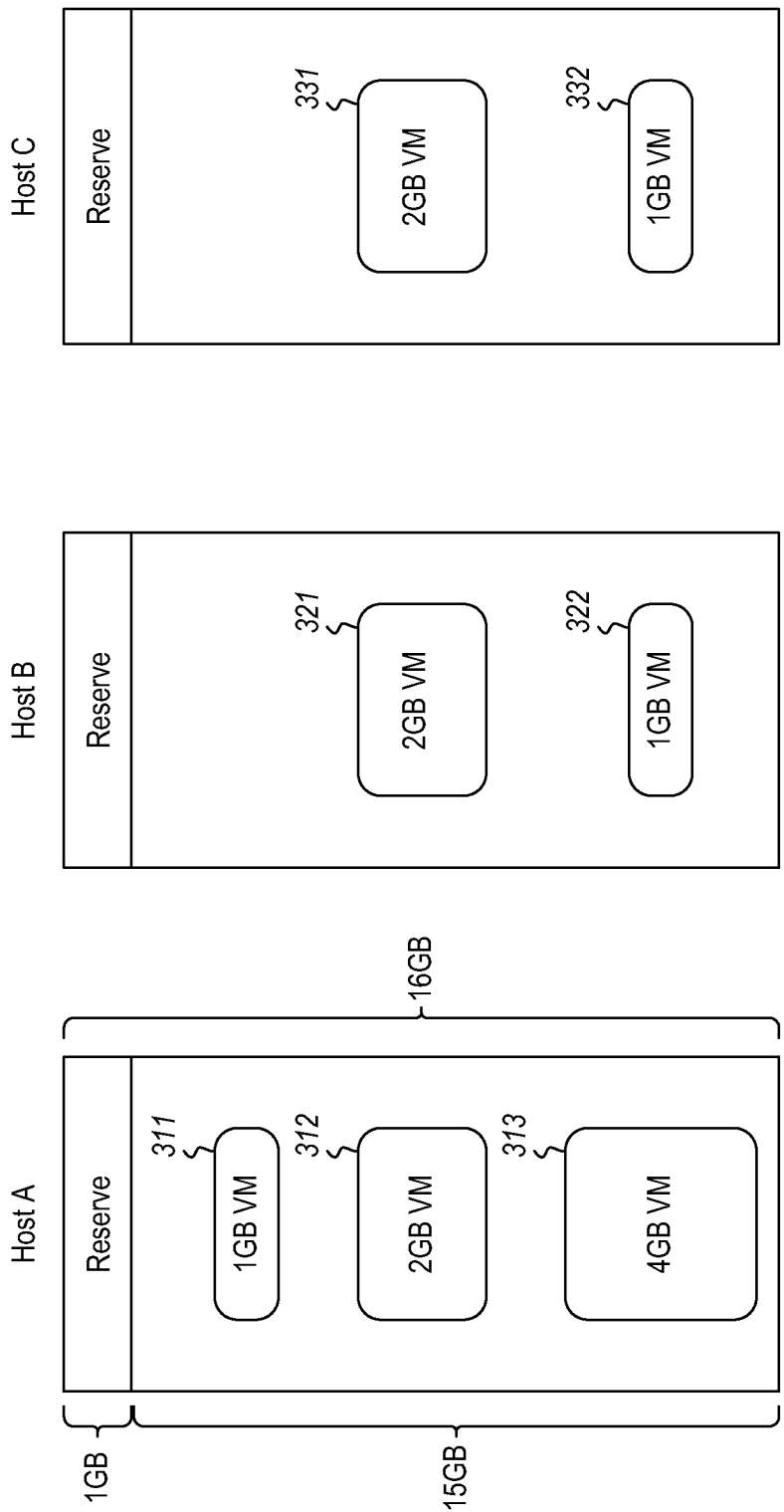
FIG. 3 illustrates an example three host cluster that is used to describe a slot-based method for providing failover guaranty estimation.

In the example of FIG. 3, there are three host computing systems; namely, host A, host B, and host C. Suppose that in this example, each host has 16 gigabytes (GB) of available memory space. Suppose that 1 gigabyte (GB) is needed to be held in reserve for operation of the host computing system generally. This leaves 15 gigabytes (GB) of available memory space for operation of the virtual machines on each host. Host A operates a 1 GB virtual machine 311, a 2 GB virtual machine 312, and a 4 GB virtual machine 313. Host B operates a 2GB virtual machine 321 and a 1 GB virtual machine 322. Host C operates a 2 GB virtual machine 331 and a 1 GB virtual machine 332.

The slot-based method may be described as follows describing the case in which a failover guaranty is to be calculated in the case of just one failed host. The following is performed for each fail scenario that falls within the guaranty. For instance, in the one failed host guaranty case, first the method is applied to host A failing (and hosts B and C continuing operation). Also, the method is applied to host B failing (and hosts A and C continuing operation). In addition, the method is applied to host C failing (and hosts A and B continuing operation).

First, assume that host A fails. The size of the slots (each capable of holding a single virtual machine) is assumed to be the size of the largest of the virtual machines on the set of hosts. Thus, throughout this example, the slot size is 4 GB, the size of the largest virtual machine 313 on any of the hosts. This is to be the size of the slots on the assumed operational hosts B and C. Thus, since the assumed operational host has only 15 GB available for providing slots, there are only three 4 GB slots possible in hosts B and C (since fractional slots are not permitted). However, host B has only 1 available slot, since virtual machine 321 will occupy one of the 4 GB slots, and virtual machine 322 will occupying another of the 4 GB slots. Furthermore, host C has only 1 available slot, since virtual machine 331 will occupy one of the 4 GB slots, and virtual machine 332 will occupying another of the 4 GB slots. Thus, there are only 2 available slots in both assumed operational hosts B and C combined. However, on the assumed failed host A, there are 3 virtual machines that would need placement. There are not enough slots on assumed operation hosts B and C to accommodate those 3 virtual machines. Accordingly, according to the slot-based method, there cannot be a failover guaranty in the case of host A failing. This alone would cause the failover guaranty estimation to conclude that there is no failover guaranty. However, for the sake of completeness, the failure of host B will next be evaluated under the slot-based method.

Next, assume that host B fails. Once again, the slot size is 4 GB, the size of the largest virtual machine 313. Thus, since assumed operational host has only 15 GB available for providing slots, there are only three 4 GB slots possible in hosts A and C. However, host A has no available slots since all three slots are occupied by virtual machines 311 through 313. Host C only has one available slot, since virtual machine 331 will occupy one of the 4 GB slots, and virtual machine 332 will occupying another of the 4 GB slots. Thus, there is only 1 available slot in both assumed operational hosts A and C combined. However, on the assumed failed host B, there are 2 virtual machines that would need placement. Thus, the slot-based method would once again estimate that the failover guaranty cannot be met for this independent reason also.

Finally, assume that host C fails. Since assumed operational hosts A and B have only 15 GB available for providing slots, there are only three 4 GB slots possible in hosts A and B. Once again, host A has no available slots since all three slots are occupied by virtual machines 311 through 313. Host B only has one available slot. Thus, there is only 1 available slot in both assumed operational hosts A and B combined. However, on the assumed failed host C, there are 2 virtual machines that would need placement. Thus, the slot-based method would once again estimate that the failover guaranty cannot be met.

Figure 4:
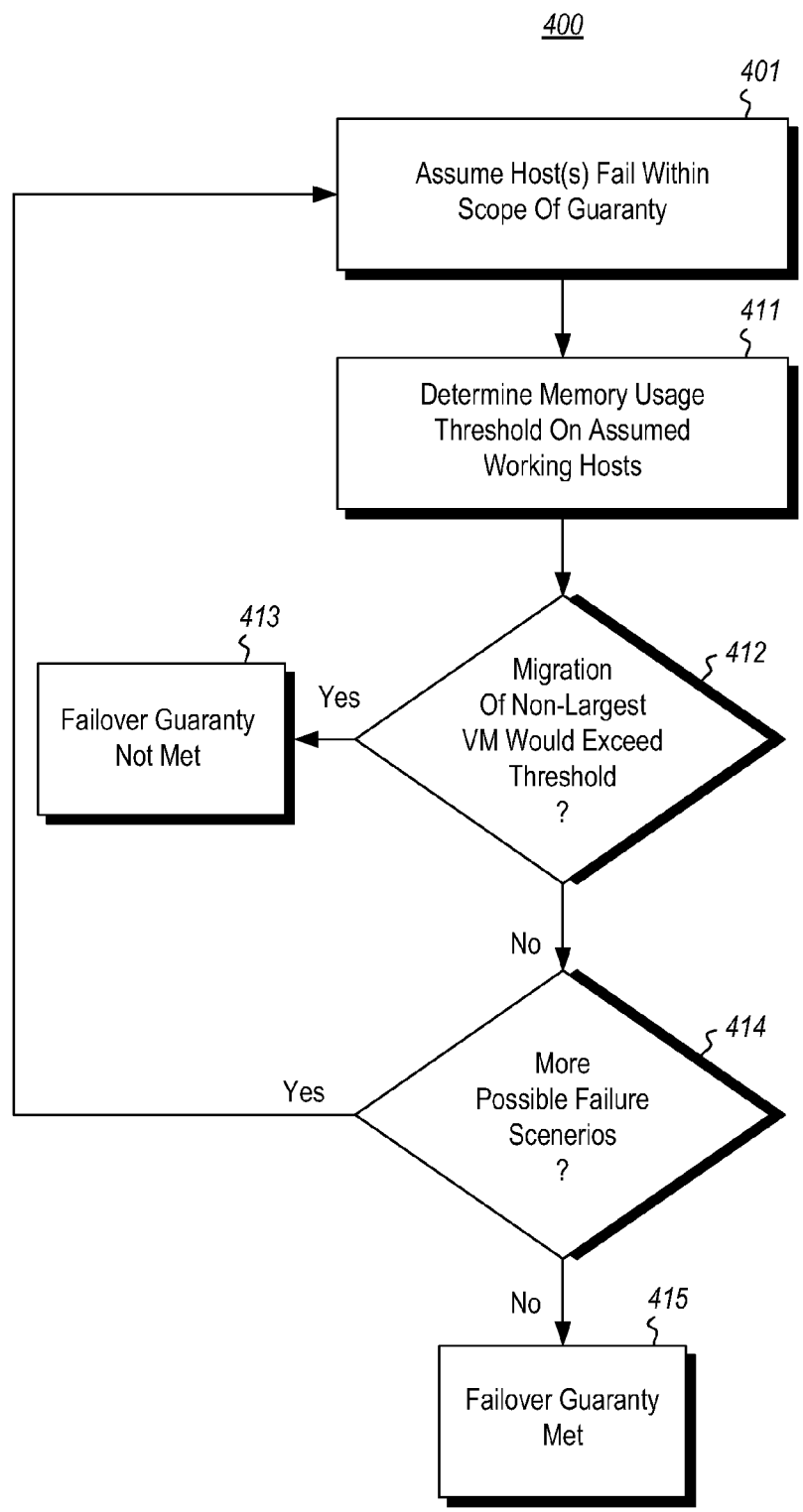
FIG. 4 illustrates a flowchart of a method for performing failover guaranty estimation using a proof by contradiction method.

Contrast the slot-based method with the proof by contraction method, which will now be described. FIG. 4 illustrates a flowchart of a method 400 for attempting to perform a proof by contradiction of the cluster failover guaranty. The proof by contradiction method 400 may be performed by the failover guaranty estimator module 202.

The module 202 assumes that a particular host set of one or more hosts fail within the scope of the failover guarantee (act 401). For instance, if the failover guaranty warrants recovery should a single host fail, but not if two hosts fail, then a particular host is selected for evaluation should that host fail. This is represented in the example of FIGS. 5A through 5C.

Figure 5A:
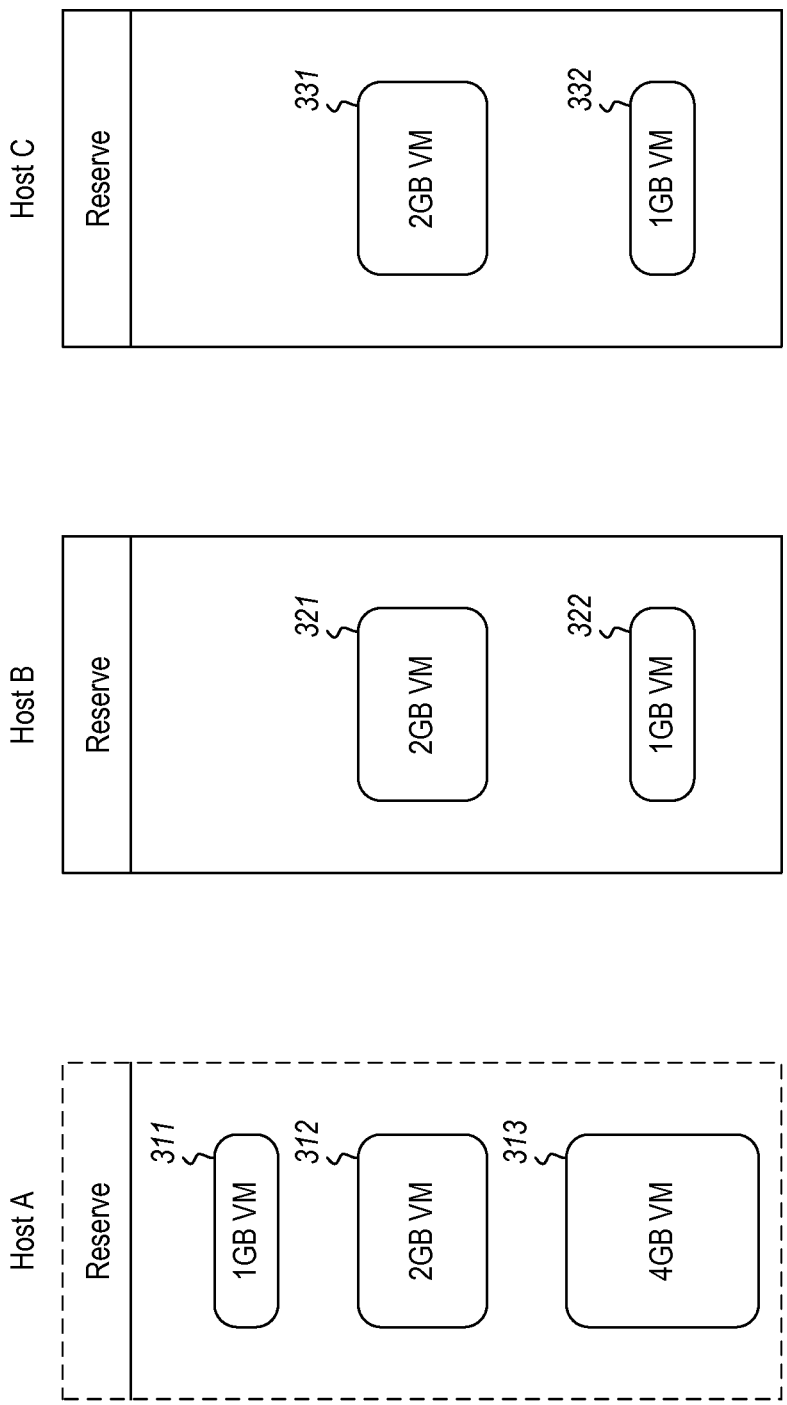
FIG. 5A illustrates the example three host cluster of FIG. 3, and in which the host A is an assumed failed host in accordance with the failover guaranty estimation using the proof by contradiction method of FIG. 4.
Figure 5B:
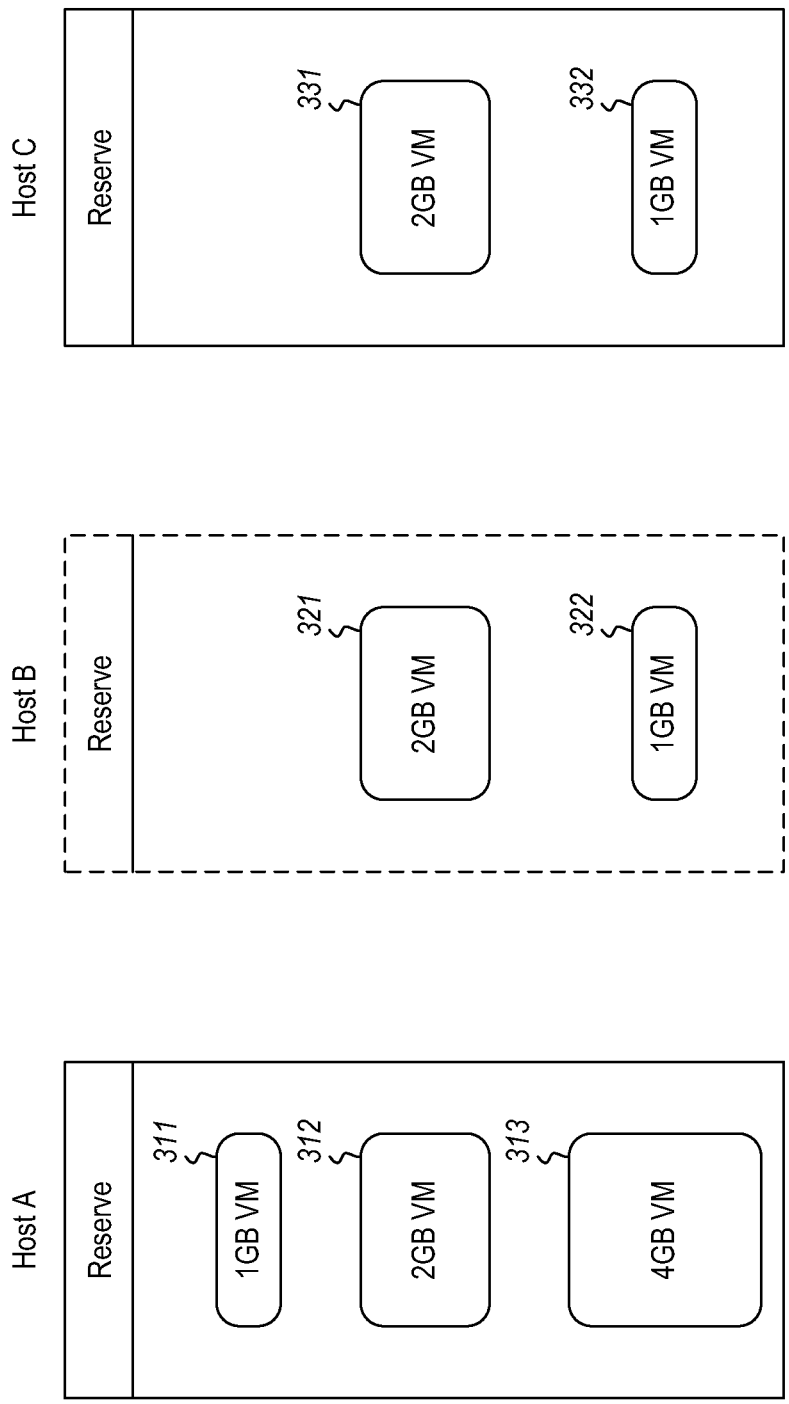
FIG. 5B illustrates the example three host cluster of FIG. 3, and in which the host B is an assumed failed host in accordance with the failover guaranty estimation using the proof by contradiction method of FIG. 4.
Figure 5C:
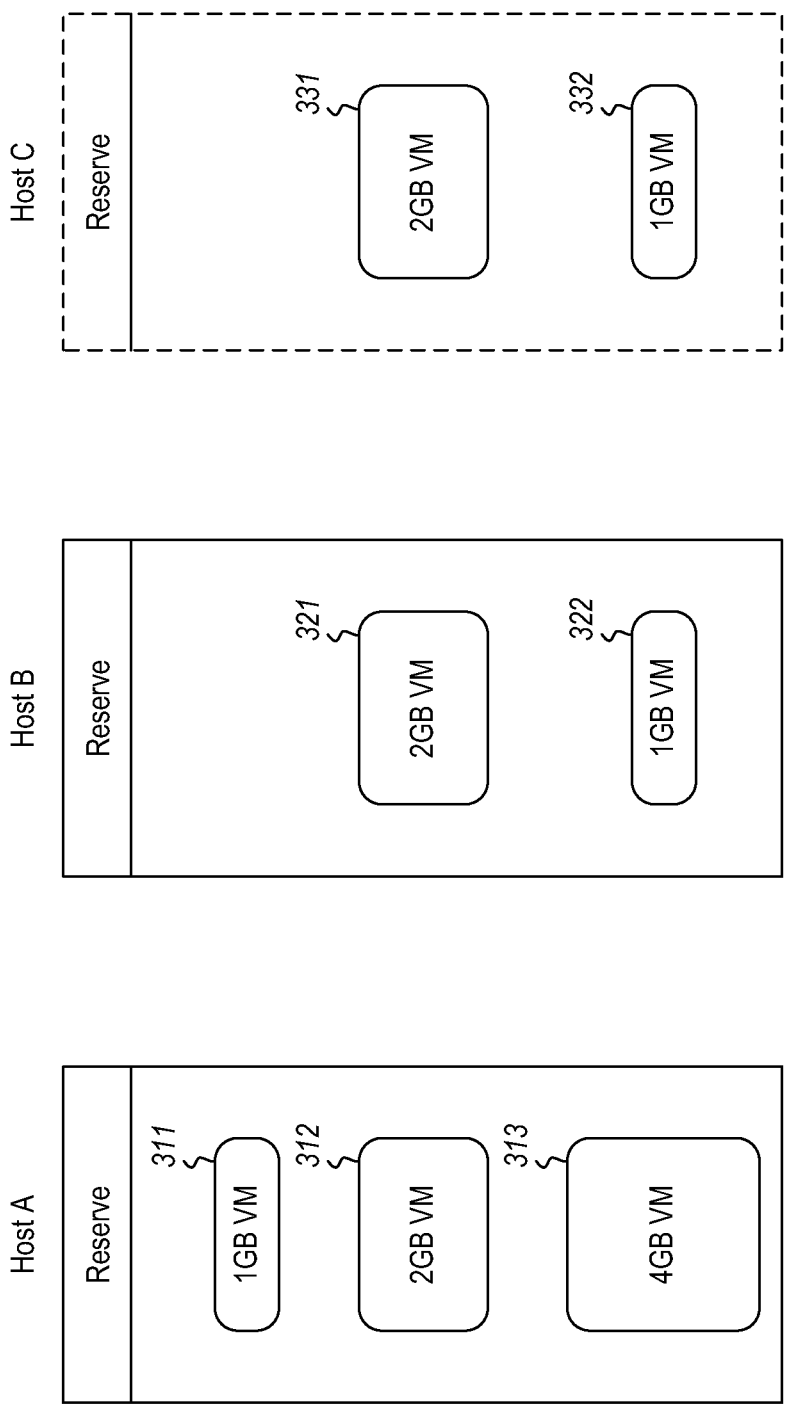
FIG. 5C illustrates the example three host cluster of FIG. 3, and in which the host C is an assumed failed host in accordance with the failover guaranty estimation using the proof by contradiction method of FIG. 4.

Referencing first FIGS. 5A through 5C, assume that the failover guaranty is that failure would occur if a single host fails. In FIG. 5A through 5C, there are three hosts, which have a similar size and occupy the same virtual machines as in the example three host system of FIG. 4. In each of FIGS. 5A through 5C, the assumed failed node is illustrated in dashed-lined boxes, and the assumed working nodes (i.e., those that are assumed to continue working) are illustrated as solid-lined boxes.

For instance, assume the method 400 begins with the assumption of FIG. 5A in which host A is assumed to be the failed node, and the nodes B and C are assumed to be the working nodes. This is the state illustrated in FIG. 5A.

The module then determines an amount of memory usage within each working host of the assumed working host set that would guaranty that a largest of the virtual machines in the failed host set would be orphaned (act 411). In the case of FIG. 5A, the failure host set constitutes only the assumed failed host A. The largest virtual machine on that assumed failed host A is the 4 GB virtual machine 313. In order to guaranty that this virtual machine would be orphaned, there would have to be 11 GB of memory usage on host B and C (15 GB of total available for virtual machines, minus 4 GB for the virtual machine 313). Any memory usage above that, if present on both hosts B and C, would guaranty that virtual machine 313 could not be placed within either host.

It is then determined if the virtual machines in the failure host set, other than the largest of the virtual machines in the failure host set, would force the determined amount of memory usage within all working hosts (decision block 412). In this case, the virtual machines 311 and 312 are the virtual machines on the assumed failed host A that are not the largest virtual machine 313 on the assumed failed host A. These two virtual machines 311 and 312 have a combined size of 3 GB.

On assumed working host B, there are already 3 GB of running virtual machines 321 and 322. Adding in the 3 GB from the virtual machines 311 and 312, the result would only be 6 GB of virtual machines. This is well below the 11 GB threshold. Furthermore, on assumed working host C, there are already 3 GB of running virtual machines 331 and 332. Adding in the 3 GB from the virtual machines 311 and 312, the result would only be 6 GB of virtual machines. Again, this is well below the 11 GB threshold.

Accordingly, decision block 412 can conclude that the movement of virtual machines 311 and 312 to either of the assumed working hosts B and C would definitely not result in either host B or host C being in a state not to be able to also receive the largest virtual machine 313 on the assumed failed host ("No" in decision block 412). According, the module would not determine that the failover guaranty cannot be met ("No" in decision block 412). If at this point, the migration of the virtual machines 311 and 312 would cause the 11 GB threshold to be exceeded in either of host B or C ("Yes" in decision block 412), then the failover guaranty would not be met (act 413), and the method 400 could cease at that point.

However, since this is not the case ("No" in decision block 412), the module proceeds to determine if there are any more failover scenarios that fall within the scope of the failover guaranty. In this case, the failover guaranty is that operation continues if any one host fails. However, the failure of host B has not yet been evaluated, and thus there are more possible permutations of failure to be evaluated ("Yes" in decision block 414).

The method 400 then proceeds with the assumption of FIG. 5B in which host B is assumed to be the failed node, and the nodes A and C are assumed to be the working nodes (act 401). The module then determines an amount of memory usage within each working host of the assumed working host set that would guaranty that a largest of the virtual machines in the failed host set would be orphaned (act 411). In the case of FIG. 5B, the failure host set constitutes only the assumed failed host B. The largest virtual machine on that assumed failed host B is the 2 GB virtual machine 321. In order to guaranty that this virtual machine would be orphaned, there would have to be 13 GB of memory usage on hosts A and C (15 GB of total available for virtual machines, minus 2 GB for the virtual machine 321). Any memory usage above that, if present on both hosts A and C, would guaranty that virtual machine 321 could not be placed within either host.

It is then determined if the virtual machines in the failure host set, other than the largest of the virtual machines in the failure host set, would force the determined amount of memory usage within all working hosts (decision block 412). In this case, the virtual machine 322 (having size 1 GB) is the only virtual machine on the assumed failed host B that is not the largest virtual machine 321 on the assumed failed host B.

On assumed working host A, there are already 7 GB of running virtual machines 311 through 313. Adding in the 1 GB from the virtual machine 322, the result would only be 8 GB of virtual machines. This is again well below the 13 GB threshold. Furthermore, on assumed working host C, there are already 3 GB of running virtual machines 331 and 332. Adding in the 1 GB from the virtual machine 322, the result would only be 4 GB of virtual machines, well below the 13 GB threshold.

Accordingly, decision block 412 can conclude that the movement of virtual machine 322 to either of the assumed working hosts A and C would definitely not result in either host A or host C being in a state not to be able to also receive the largest virtual machine 321 on the assumed failed host ("No" in decision block 412). According, the module would not determine that the failover guaranty cannot be met ("No" in decision block 412). The module proceeds to determine if there are any more failover scenarios that fall within the scope of the failover guaranty. In this case, the failover guaranty is that operation continues if any one host fails. However, the failure of host C has not yet been evaluated, and thus there are more possible permutations of failure to be evaluated ("Yes" in decision block 414).

The method 400 then proceeds with the assumption of FIG. 5C in which host C is assumed to be the failed node, and the nodes A and B are assumed to be the working nodes (act 401). The module then determines an amount of memory usage within each working host of the assumed working host set that would guaranty that a largest of the virtual machines in the failed host set would be orphaned (act 411). In the case of FIG. 5C, the failure host set constitutes only the assumed failed host C. The largest virtual machine on that assumed failed host C is the 2 GB virtual machine 331. In order to guaranty that this virtual machine would be orphaned, there would have to be 13 GB of memory usage on host A and B (15 GB of total available for virtual machines, minus 2 GB for the virtual machine 321). Any memory usage above that, if present on both hosts A and B, would guaranty that virtual machine 331 could not be placed within either host.

It is then determined if the virtual machines in the failure host set, other than the largest of the virtual machines in the failure host set, would force the determined amount of memory usage within all working hosts (decision block 412). In this case, the virtual machine 332 (having size 1 GB) is the only virtual machine on the assumed failed host C that is not the largest virtual machine 331 on the assumed failed host C.

On assumed working host A, there are already 7 GB of running virtual machines 311 through 313. Adding in the 1 GB from the virtual machine 332, the result would only be 8 GB of virtual machines. This is again well below the 13 GB threshold. Furthermore, on assumed working host B, there are already 3 GB of running virtual machines 321 and 322. Adding in the 1 GB from the virtual machines 332, the result would only be 4 GB of virtual machines, well below the 13 GB threshold.

Accordingly, decision block 412 can conclude that the movement of virtual machine 332 to either of the assumed working hosts A and B would definitely not result in either host A or host B being in a state not to be able to also receive the largest virtual machine 331 on the assumed failed host ("No" in decision block 412). According, the module would not determine that the failover guaranty cannot be met ("No" in decision block 412). The module proceeds to determine if there are any more failover scenarios that fall within the scope of the failover guaranty. In this case, the failover guaranty is that operation continues if any one host fails. However, the failures of hosts A, B and C have already been evaluated, and there are no more possible permutations of failure to be evaluated ("No" in decision block 414). Thus, in this case, the failover guaranty estimation module 202 determines that the guaranty has been met (act 415).

Figure 6:
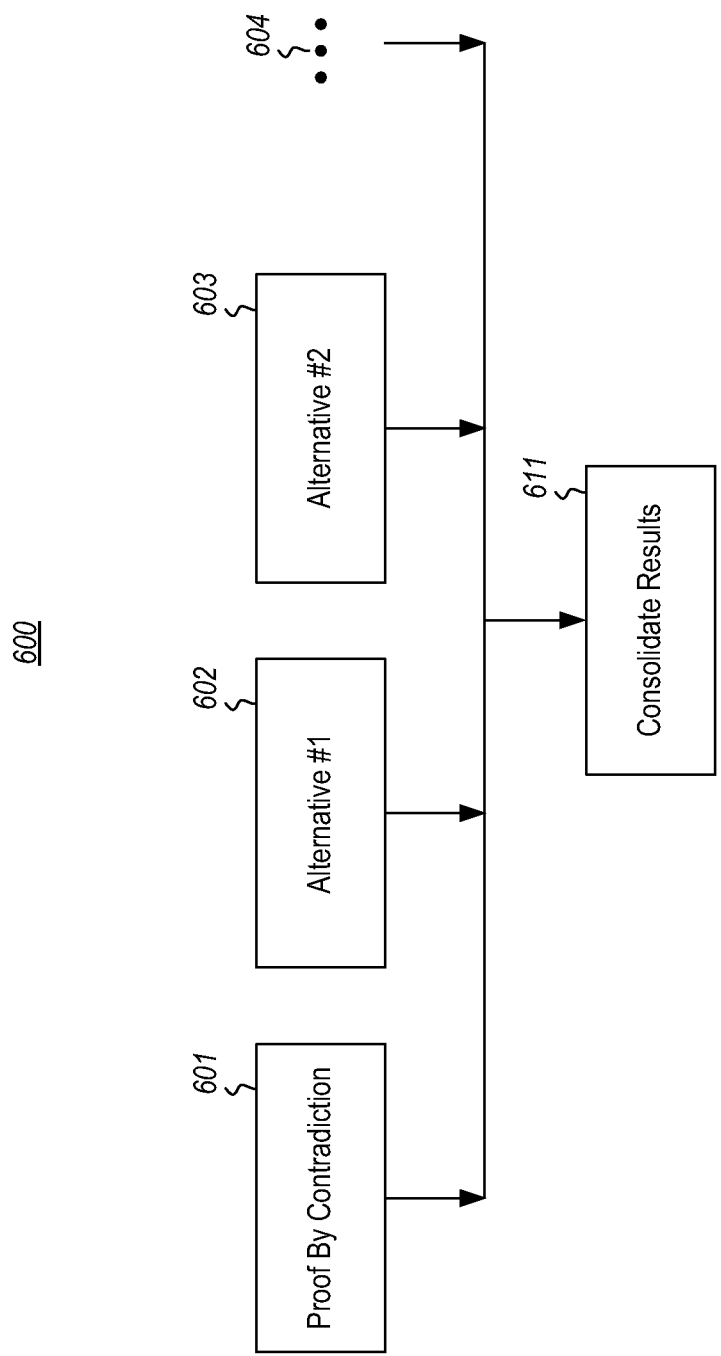
FIG. 6 illustrates a flowchart of a method for aggregating results from various methods to providing failover guaranty estimation.

Thus, for the same three host set (the example of FIG. 3), the method 400 results in a guaranty that failover can be handled, whereas the slot-based method does not. However, FIG. 6 illustrates a flowchart of a method 600 for performing a failure guaranty estimation. Once again, the method 600 may be performed by the failover guaranty estimation module 202. In this method 600, the module performs the proof by contradiction method (act 601) for proving that the cluster failover guaranty can be met for the cluster. An example of this was the method 400 of FIG. 4. However, the method 600 also performs at least one alternative method (act 602) for proving that the cluster failover guaranty can be met for the cluster. An example of this method is the slot based method. Optionally, additional alternative methods may be performed (act 603) for proving that the cluster failover guaranty can be met for the cluster. Further alternative methods may be performed as represented by the ellipses 604. The results are then consolidated (act 611) in order to obtain the failover guaranty estimation.

This allows for more accurate failover guaranty estimation to be performed. After all, the failure guaranty estimation method that performs best may be different depending on the circumstances of the hosts, and how those virtual machines are distributed and sized throughout the hosts. For instance, the method 400 performs more accurately when the virtual machines have a wide disparity in size, and where some hosts have smaller virtual machines, and some larger. However, the slot-based method performs quite well when the virtual machines are equally sized. Nevertheless, for most circumstances, the method 400 works more accurately than the slot-based method. Accordingly, by consolidating results from different methods, a more accurate guaranty of failover estimation can be arrived at.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing environment comprising:
    a cluster comprising a plurality of hosts, each host comprising hardware resources, and configured to operate a plurality of virtual machines thereon using the hardware resources; and
    a failover guaranty estimator module configured to attempt to perform a proof by contradiction method showing that a cluster failover guaranty can be met for the cluster, the proof by contraction method comprising the following:
        an act of assuming a particular host set of one or more hosts fails, the assumed failure host set being a subset of the plurality of hosts in the cluster, the hosts of the cluster that are not in the host set being assumed to be a working host set of one or more working hosts; and
        an act of performing a per-failure host set method for the failure host set, the per-failure host set method comprising the following:
            an act of determining a minimum amount of memory usage within each working host of the assumed working host set that would guaranty that a largest of the virtual machines in the failure host set would be orphaned; and
            an act of determining if the virtual machines in the failure host set, other than the largest of the virtual machines in the failure host set, would cause the determined minimum amount of memory usage to be exceeded within all working hosts, and if so, determining that the failover guaranty is not met.

2. The computing environment of claim 1, wherein the proof by contradiction method further comprises:
    an act of determining how many host failures that should be accounted for in the cluster failover guaranty, wherein the act of assuming comprise an act of assuming a particular host set of the determined number fails.

3. The computing environment of claim 2, wherein the determined number of host failures is one.

4. The computing environment of claim 2, wherein the determined number of host failures is more than one.

5. The computing environment of claim 2, wherein the per-failure host set method is performed for each possible permutation of per-failure host set in the cluster given the assumed number of host failures.

6. The computing environment of claim 1, wherein the failover guaranty estimator module is a component of a virtual machine manager that assigns virtual machines to hosts within the cluster.

7. The computing environment of claim 1, wherein each of the plurality of hosts is a server within a server rack.

8. The computing environment of claim 1, wherein the failover guaranty estimator module is further configured to attempt to perform an alternative method for proving that the cluster failover guaranty can be met for the cluster.

9. The computing environment of claim 8, wherein the failover guaranty estimator module is configured to consolidate results of the proof by contradiction method and the alternative method in order to obtain a failover guaranty estimation.

10. The computing environment of claim 8, wherein the alternative method is a slot based method.

11. The computing environment of claim 8, wherein the alternative method is a first alternative method, wherein the failover guaranty estimator module is further configured to perform a second alternative method for providing that the cluster failover guaranty can be met for the cluster.

12. The computing environment of claim 11, wherein the failover guaranty estimator module is configured to consolidate results of the proof by contradiction method and the first and second alternative methods in order to obtain a failover guaranty estimation.

13. A computer program product comprising one or more physical computer storage media having stored thereon computer-executable instructions that, when executed by one or more processors of a computing system, cause the computing system to instantiate in a memory a failover guaranty estimator module that is configured to attempt to perform a proof by contradiction method showing that a cluster failover guaranty can be met for a cluster comprising a plurality of hosts, each hosting a plurality of virtual machines, the proof by contraction method comprising the following:

an act of assuming a particular host set of one or more hosts fails, the assumed failure host set being a subset of the plurality of hosts in the cluster, the hosts of the cluster that are not in the host set being assumed to be a working host set of one or more working hosts;

an act of performing a per-failure host set method for the failure host set, the per-failure host set method comprising the following:

an act of determining a minimum amount of memory usage within each working host of the assumed working host set that would guaranty that a largest of the virtual machines in the failure host set would be orphaned; and an act of determining if the virtual machines in the failure host set, other than the largest of the virtual machines in the failure host set, would cause the determined minimum amount of memory usage to be exceeded within all working hosts, and if so, determining that the failover guaranty is not met.

14. The computer program product of claim 13, wherein the proof by contradiction method further comprises:

an act of determining how many host failures that should be accounted for in the cluster failover guaranty, wherein the act of assuming comprise an act of assuming a particular host set of the determined number fails.

15. The computer program product of claim 14, wherein the per-failure host set method is performed for each possible permutation of per-failure host set in the cluster given the assumed number of host failures.

16. The computer program product of claim 13, wherein the failover guaranty estimator module is further configured to attempt to perform an alternative method for proving that the cluster failover guaranty can be met for the cluster.

17. The computer program product of claim 16, wherein the failover guaranty estimator module is configured to consolidate results of the proof by contradiction method and the alternative method in order to obtain a failover guaranty estimation.

18. The computer program product of claim 16, wherein the alternative method is a slot based method.

19. A computerized method for attempting to perform a proof by contradiction method showing that a cluster failover guaranty can be met for a cluster comprising a plurality of hosts, each hosting a plurality of virtual machines, the proof by contraction method comprising the following:

an act of determining how many host failures that should be accounted for in the cluster failover guaranty, wherein the act of assuming comprise an act of assuming a particular host set of the determined number fails; and for each possible permutation of host failures of the determined number of host failures in the cluster given the assumed number of host failures, an act of performing the following:

an act of assuming a particular host set of the predetermined number fails, the assumed failure host set being a subset of the plurality of hosts in the cluster, the hosts of the cluster that are not in the host set being assuming to be a working host set of one or more working hosts;

an act of performing a per-failure host set method for the failure host set, the per-failure host set method comprising the following:

an act of determining a minimum amount of memory usage within each working host of the assumed working host set that would guaranty that a largest of the virtual machines in the failure host set would be orphaned; and an act of determining if the virtual machines in the failure host set, other than the largest of the virtual machines in the failure host set, would cause the determined minimum amount of memory usage to be exceeded within all working hosts, and if so, determining that the failover guaranty is not met.

20. The computerized method of claim 19, further comprising:

an act of attempting to perform an alternative method for proving that the cluster failover guaranty can be met for the cluster, wherein the failover guaranty estimator module is configured to consolidate results of the proof by contradiction method and the alternative method in order to obtain a failover guaranty estimation.

* * * * *